Aug. 10, 1965

M. G. TOWNSLEY 3,200,411

MOTION PICTURE CAMERAS

Filed Nov. 20, 1961

Inventor:
Malcolm G. Townsley
By Robert F. Miehle,
J. R. Hall
Attys.

M. G. TOWNSLEY 3,200,411

MOTION PICTURE CAMERAS

Filed Nov. 20, 1961

Inventor:
Malcolm G. Townsley
By Robert H. Michler
J. R. Hall
Attys.

Aug. 10, 1965  M. G. TOWNSLEY  3,200,411
MOTION PICTURE CAMERAS
Filed Nov. 20, 1961  8 Sheets-Sheet 5

Inventor:
Malcolm G. Townsley
By Robert F. Miehl
J. R. Hall
Attys

Aug. 10, 1965    M. G. TOWNSLEY    3,200,411
MOTION PICTURE CAMERAS

Filed Nov. 20, 1961    8 Sheets-Sheet 8

Inventor:
Malcolm G. Townsley
By Robert F. Miehle
J. R. Hall
Attys.

United States Patent Office 3,200,411
Patented Aug. 10, 1965

3,200,411
MOTION PICTURE CAMERAS
Malcolm G. Townsley, Park Ridge, Ill., assignor to Bell & Howell Company, Chicago, Ill., a corporation of Illinois
Filed Nov. 20, 1961, Ser. No. 153,414
9 Claims. (Cl. 352—140)

This invention relates to motion picture cameras, and more particularly to full time power zoom motion picture cameras.

An object of the invention is to provide a full time power zoom camera.

Another object of the invention is to provide a motion picture camera having a zoom lens which may be driven from the drive of the camera selectively while feeding and exposing film and while not feeding nor exposing the film.

A further object of the invention is to provide a motion picture camera having a zoom lens and a camera drive normally driving film feeding means together with selectively operable means to connect and disconnect the lens to and from the drive and selectively operable means to render the film driving means operable and inoperable.

A complete understanding of the invention may be obtained from the following detailed description of a motion picture camera forming one embodiment thereof, when read in conjunction with the appended drawings, in which.

The invention provides a full time power zoom camera wherein a zoom lens may be power driven by the drive of the camera both when the camera is operated to expose and feed film and when film is neither exposed nor fed. The drive of the camera may be selectively connected to the zoom lens and the film feeding and exposing means may be selectively rendered operable and disabled. The camera may include a manually operable slide having a first portion for actuating the motor drive of the camera, a second portion for holding a film feeding shuttle out of feeding engagement with the film, a capping shutter operable to cover an exposure aperture and a portion for disconnecting a film footage counter from the drive. The camera also has a manually operable power takeoff operable between neutral and reversible directions for connecting the zoom lens to the drive.

Figure 1:
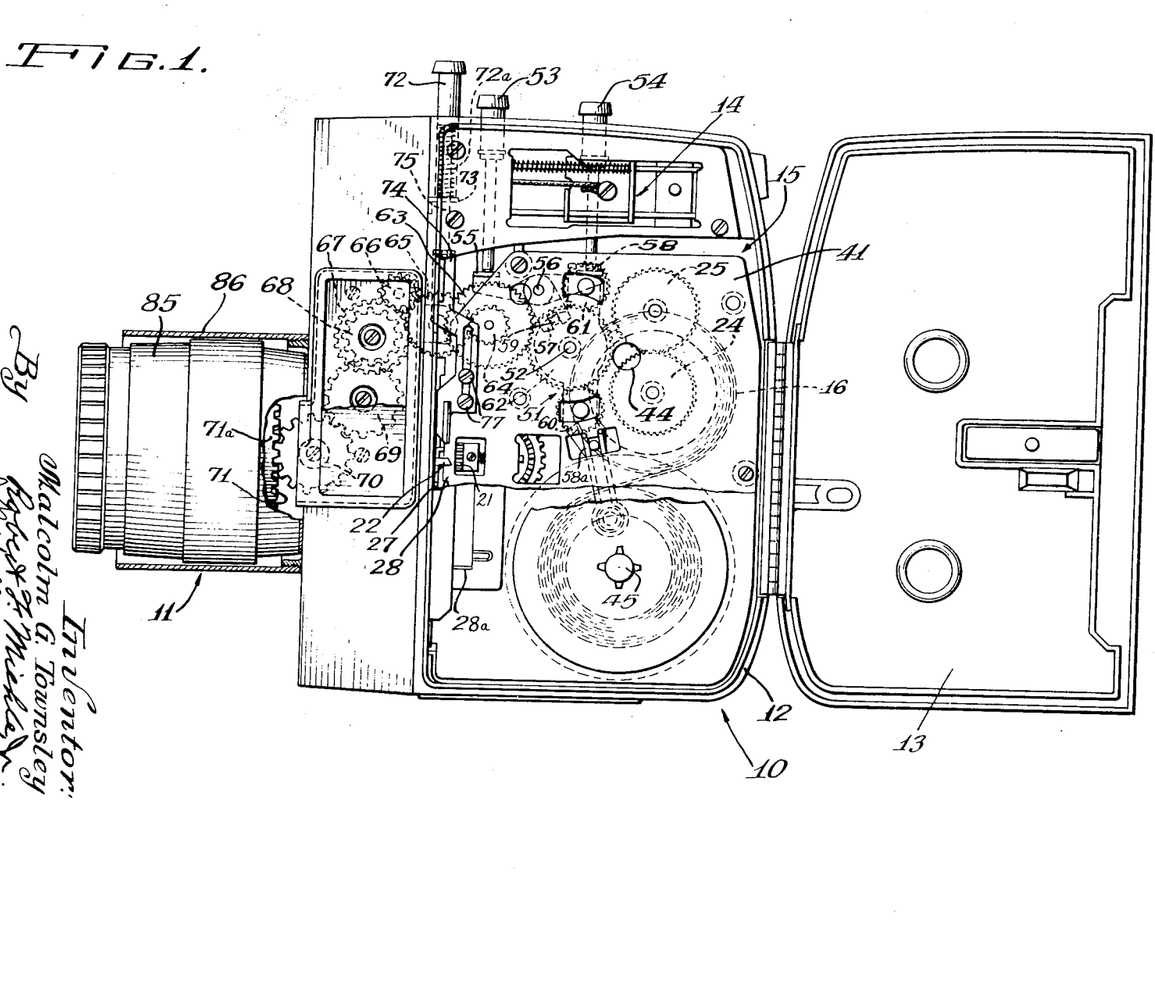
FIG. 1 is a side elevation view of a motion picture camera forming one embodiment of the invention with portions thereof broken away.
Figure 4:
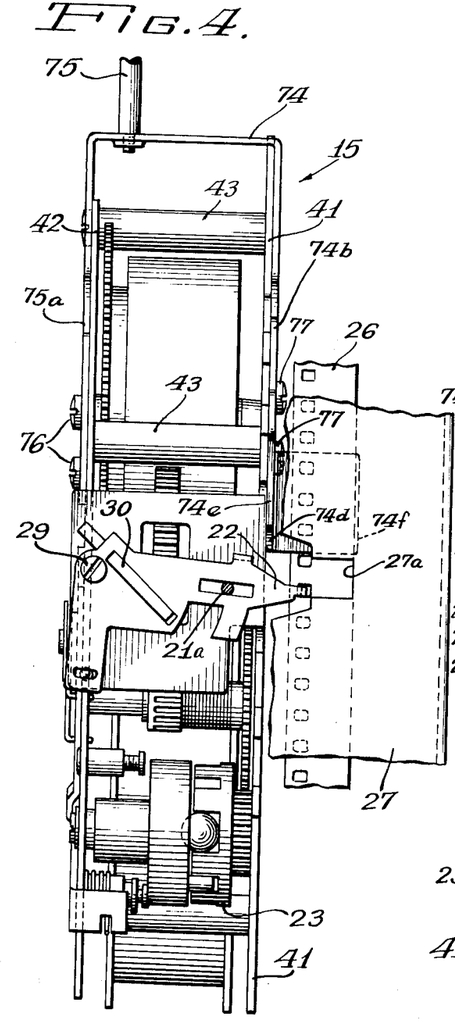
FIG. 4 is an enlarged, fragmentary, front elevation view of the main mechanism of the camera of FIG. 1.
Figure 5:
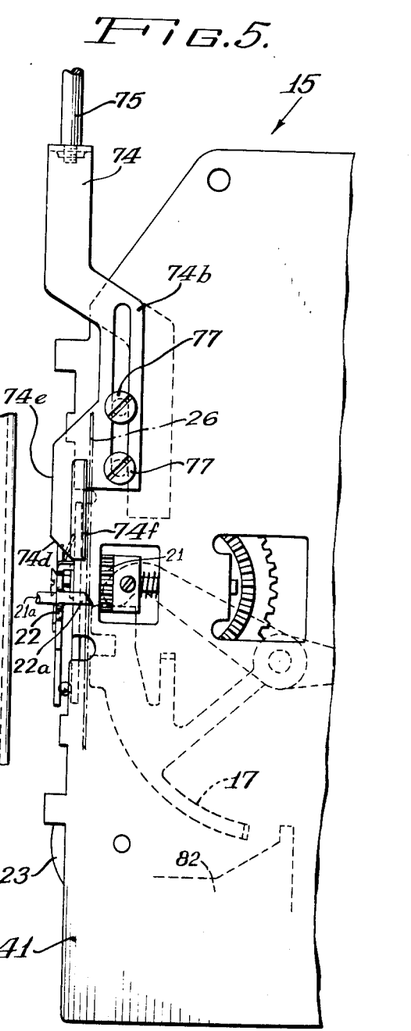
FIG. 5 is a side elevation of the mechanism.
Figures 6, 7:
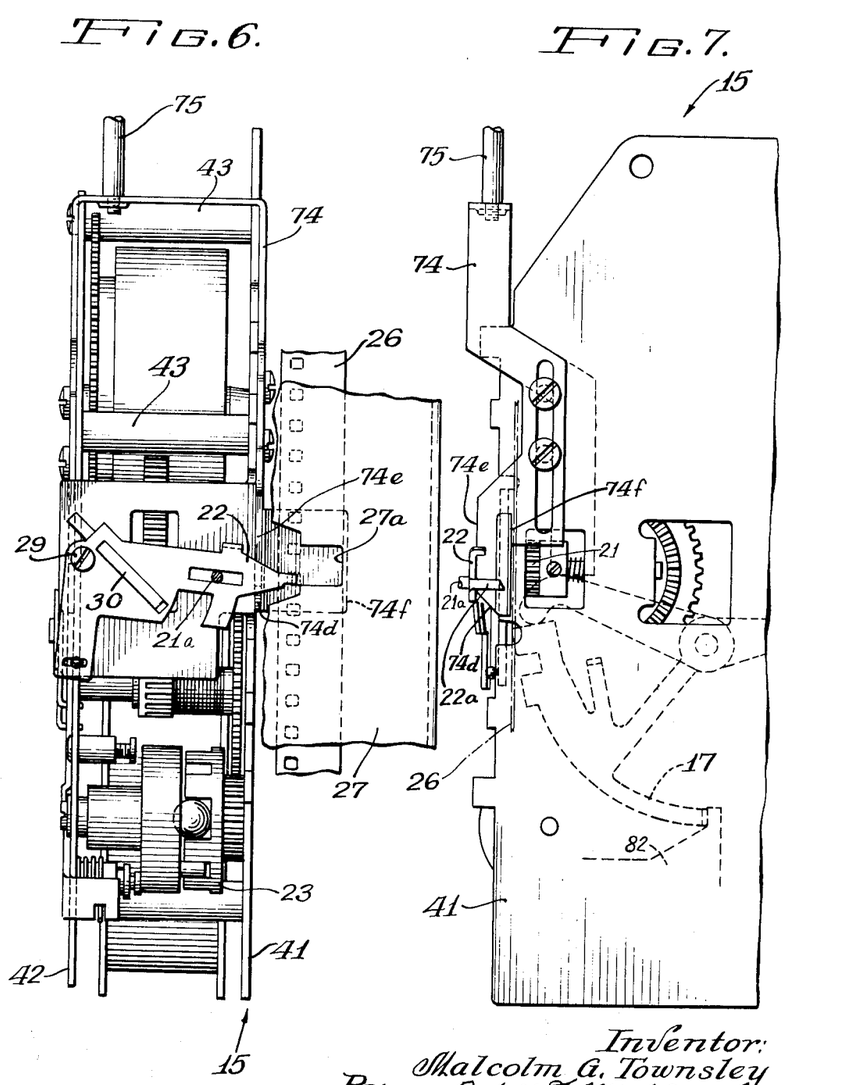
FIGS. 6 and 7 are views similar to FIGS. 4 and 5, respectively, but with parts of the mechanism in different positions.
Figure 8:
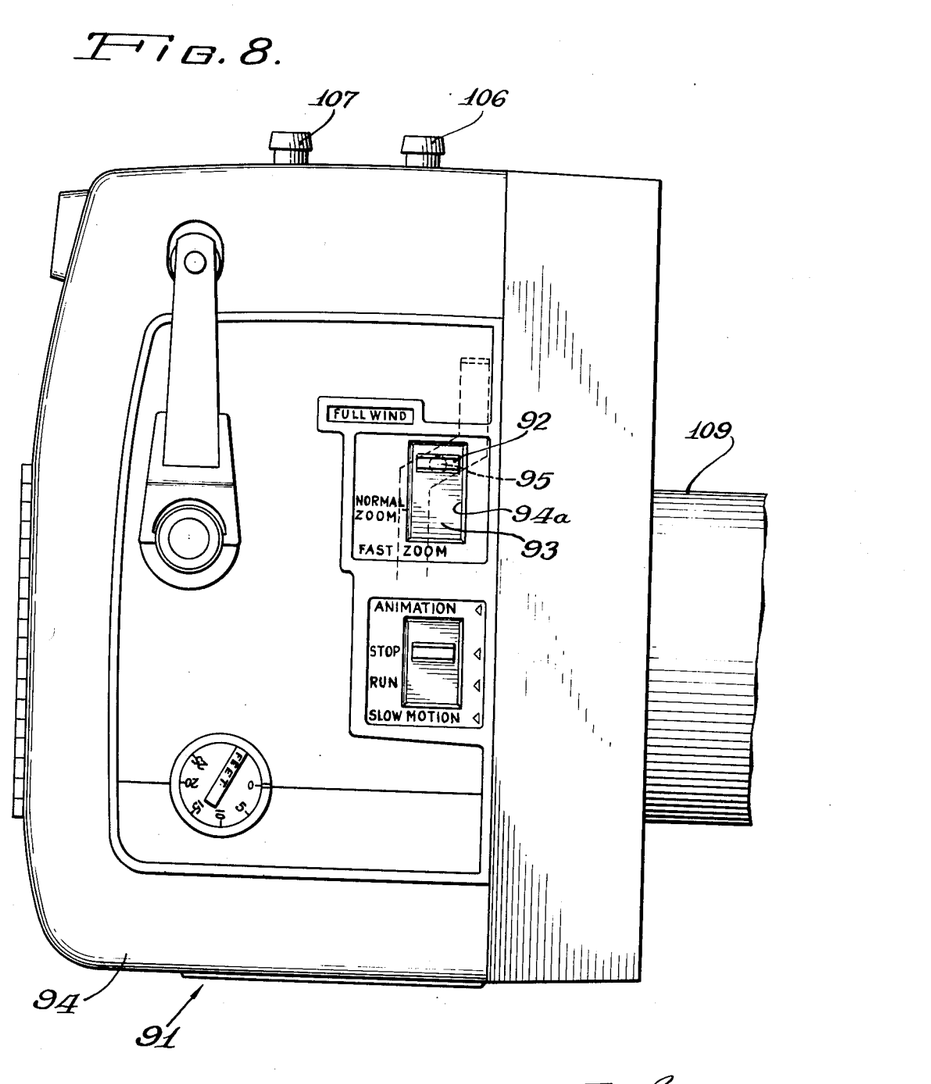
FIG. 8 is an enlarged side elevation view of a motion picture camera forming another embodiment of the invention.
Figure 9:
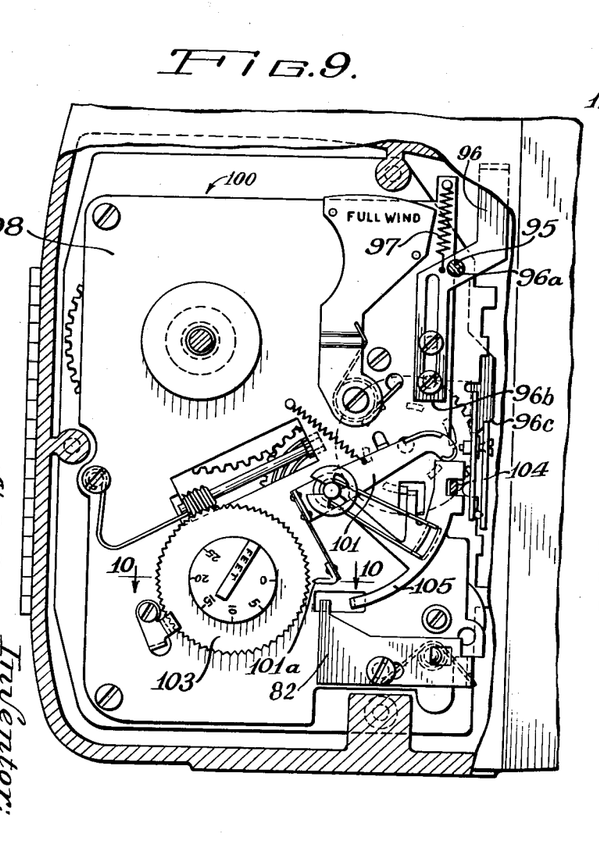
FIG. 9 is a side elevation view of the camera of FIG. 8.
Figures 10, 11:
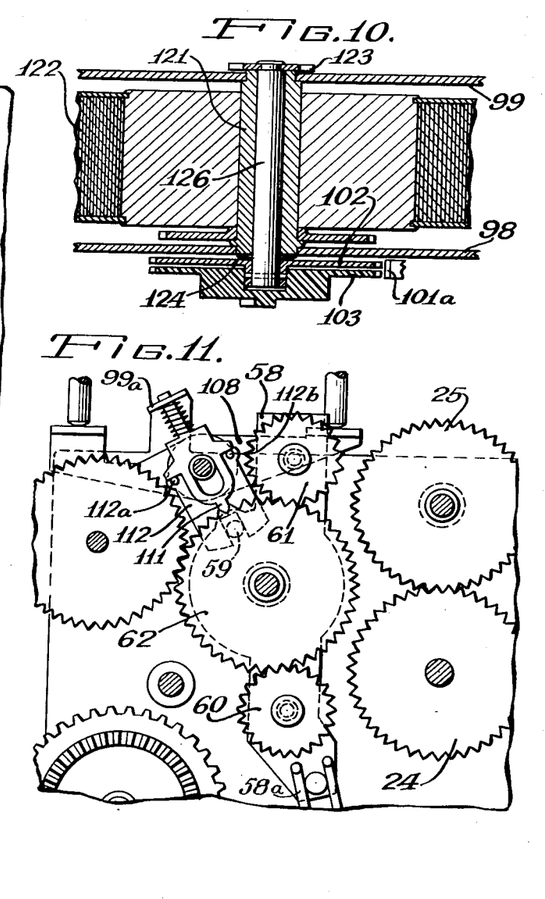
FIG. 10 is a section taken along line 10—10 of FIG. 9.
FIG. 11 is a fragmentary, side elevation view of the camera of FIG. 9.

Referring now in detail to the drawings, there is shown therein a full time power zoom motion picture camera 10 (FIGS. 1, 2 and 3) having a known zoom lens 11, a housing 12, a door 13, a viewfinder 14, and a clockwork-like camera mechanism 15. The camera mechanism 15 includes a known negator spring motor drive 16, which, when released by pivotal movement of a control arm 17 from its position of FIG. 2 to that of FIG. 3, serves to rotate a scroll gear 18 to drive a worm 19 to rotate a film footage indicator dial 20, to rotate a gear 21 carrying a known crank pin 21a (FIGS. 4 and 6) to oscillate a known shuttle or film pulldown claw 22 and turn a known shutter (not shown), to drive a known governor 23, and to rotate gears 24 and 25 (FIG. 1). The shuttle is urged by spring 30 toward feeding engagement with film 26 (FIGS. 4 to 6) in a position between a known aperture plate 27 having an exposure aperture 27a and a known pressure plate 28 (FIG. 1). The shuttle is pivoted on pin 29 (FIGS. 4 and 6). The gear 21 also carries a known disc segment type of shutter (not shown) which covers the aperture 27a during feed of the film and when the camera drive is stopped.

A known manual control member 31 (FIGS. 2 and 3) operable by a finger of a user of the camera is carried with a button portion (not shown) slidable on the side of the housing 12 and extends through a slot (not shown) in the housing 12. When the control member 31 is moved from its stop position shown in FIG. 2 downwardly to its run position shown in FIG. 3, the arm 17 releases the spring motor drive 16 by a known mechanism 32 to permit the drive to run in a known manner as regulated by governor 23. A spring 33 normally urges the arm 17 to its stop position. The camera mechanism 15 includes mounting plates 41 and 42 secured to spacers 43 (FIGS. 4 and 6), and is fixed in the housing 12 in a known manner. The camera includes a film supply spindle 44 (FIG. 1) and film takeup spindle 45, the latter being driven by the camera mechanism 15 through a known slipping clutch (not shown).

Figure 3:
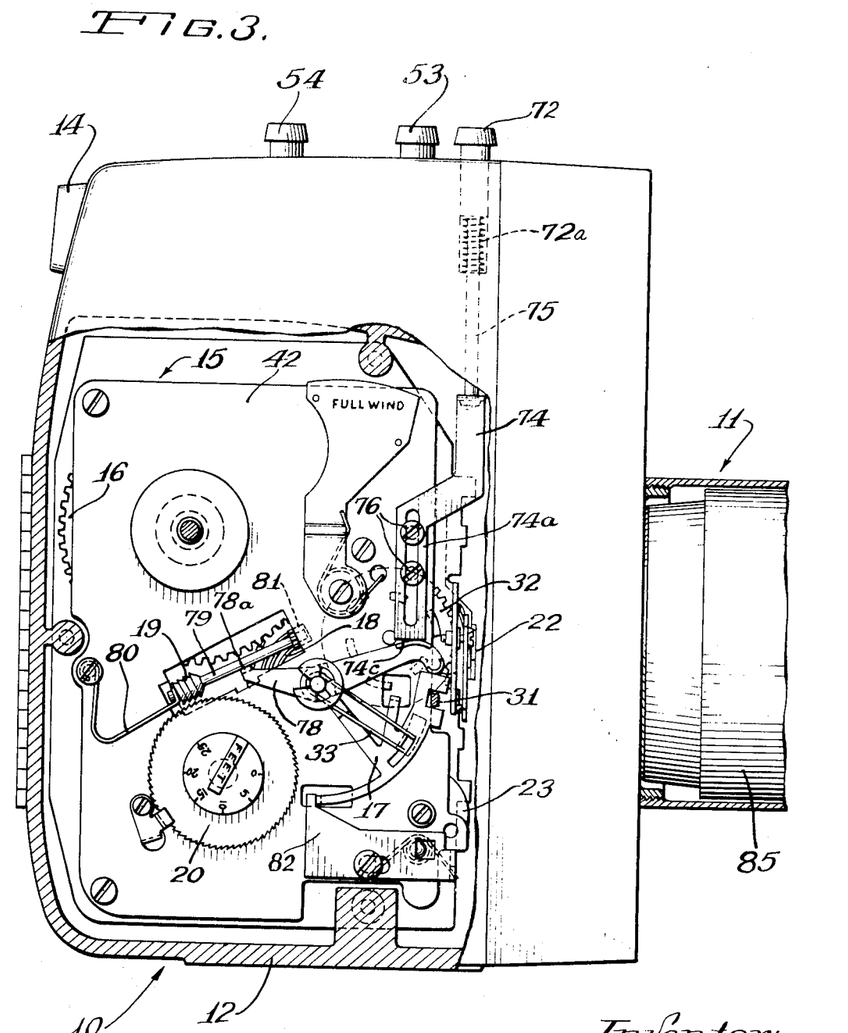
FIG. 3 is a view similar to FIG. 2 with parts of the camera in different positions from those of FIG. 2.

To zoom the lens 11 while the camera is actuated to feed and expose film by manually pushing the control member 31 to and holding the control member in the position shown in FIG. 3, a reversible tumbler gear mechanism 51 (FIG. 1) is pivoted from its shown neutral position on pin 52 either by manually depressing plunger 53 or by manually depressing plunger 54 to pivot rocker 55 to turn shaft 56 keyed to the rocker 55, which turns fork 57 keyed to shaft 56. The fork 57 swings plate 58 on the pin 52 through pin 59 rigidly fixed to plate 58. The plate 58 swings, depending on which of buttons 53 and 54 is depressed, gear 60 or gear 61 into engagement with gear 24 or gear 25. The gear 60 or 61 is driven by the gear 24 or 25 and rotates gear 62 to drive the lens 11 through a known gear train including gears 63, 64, 65, 66, 67, 68, 69 and 70, and a crown gear 71 forming the end of a known rotatable zooming sleeve 71a. A spring 58a normally urges the plate 58 to its neutral position.

Figure 2:
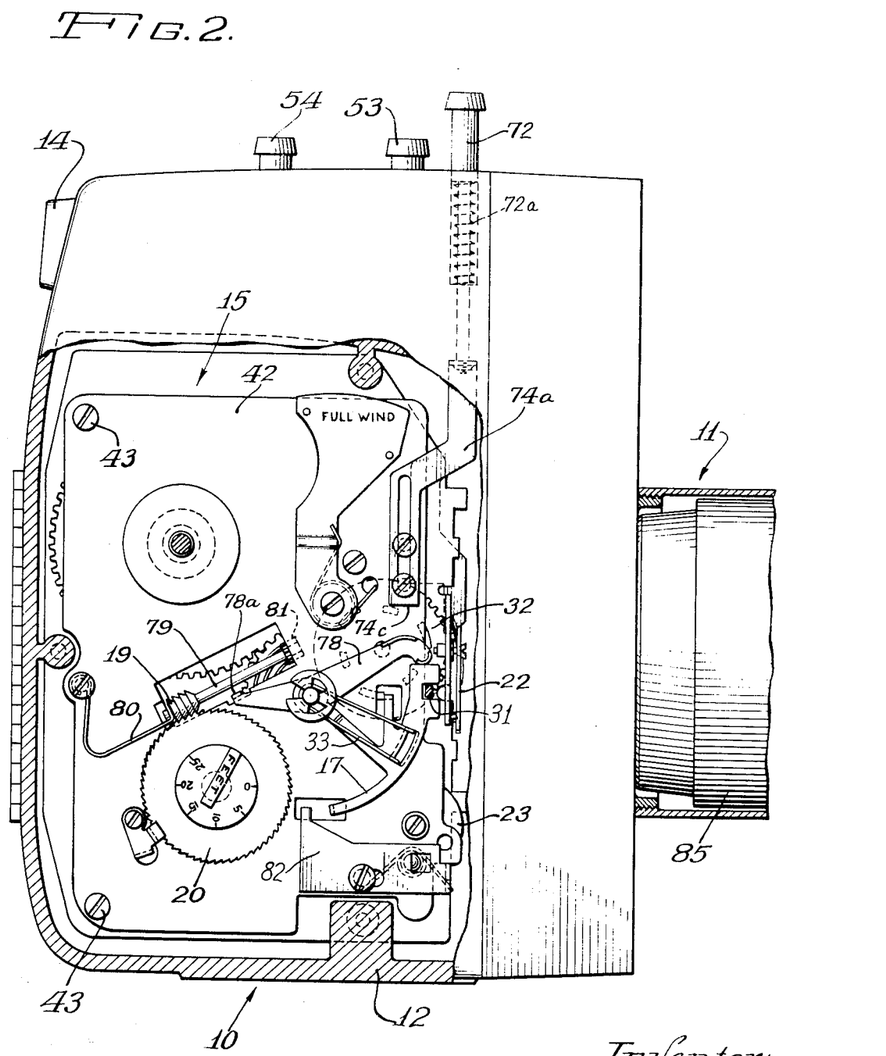
FIG. 2 is an enlarged side elevation view of the camera of FIG. 1 with portions thereof broken away.

To zoom the lens 11 without feeding the film 26 (FIG. 4) past the exposure aperture 27a and without exposing the film, a push button 72 is depressed from its position of FIG. 2 to that of FIG. 3 and is held in the latter position while the desired one of push buttons 53 and 54 is depressed. The push button 72 is urged upwardly by spring 72a seated on bracket 73, and is rigidly connected to yoke or slide 74 by rod 75. The slide has one slotted arm 75a slidably mounted by screws 76 on plate 42 and a second slotted arm 74b slidably mounted by screws 77 on plate 41. When the slide 74 is moved down by depressing push button 72, end 74c (FIGS. 2 and 3) moves lever 78 from its position of FIG. 2 to that of FIG. 3. The righthand end of lever 78 moves the control arm 17 from its stop position of FIG. 2 to its run position of FIG. 3. This releases the camera spring motor drive 16. Meanwhile, tab 78a of lever 78 swings shaft 79 clockwise against known spring 80 as permitted by known loose bearing 81 to disconnect the gear 19 from the film footage counter indicator 20. Also just before the spring motor drive 16 is released to run, a capping shutter 74f (FIGS. 4 to 7) of arm 74b is moved completely under the exposure aperture 27a to cover the film behind the aperture 27a and a cam 74d of arm 74b is slid under the shuttle 22 to hold ratchet-like end 22a of the shuttle completely out of feeding engagement with the film while permitting free oscillation of the shuttle along dwell 74e of the cam 74d. A known snubber portion 28a (FIG. 1) at the lower end of the pressure plate 28 prevents the takeup spindle from pulling the film through the gate area as is well known in the art.

The above construction enables the lens 11 to be zoomed at a rapid rate as well as at the normal rate, also without exposing or feeding film and without changing the footage indicator. This is effected by depressing the push button further from its position of FIG. 3 to move plate 82 through arm 17 to the left to change the governor 23 from normal (sixteen frames per second) to slow motion (e.g. forty-eight frames per second) and the camera drive mechanism runs at this high speed to zoom while the gear 19 is held still further out of engagement with the gear indicator 20, the capping shutter 74f (FIG. 6) covers the exposure aperture 27a and the dwell portion 74e is under the shuttle 22.

If desired to prevent zooming of the lens 11 by accidentally brushing outer lens sleeve 85 (FIG. 1), a sleeve 86 is fixed to the housing 12 and prevents any manual turning of the lens sleeve 85 to change the zoom adjustment.

In FIGS. 8 to 11 there is shown a full time power zoom camera 91 which is generally like the camera 10 but differs as outlined below. Instead of the push button 72, the camera 91 has a push button 92 fixed to vertically sliding cover plate 93 located behind slot 94a in housing 94. Pin 95 fixed to plate 93 projects through hole 96a of yoke 96 (FIG. 9), which is otherwise substantially identical with yoke 74, the rod 75 being omitted. A spring 97 urges the yoke upwardly toward a retracted position on mechanism plates 98 and 99 (FIG. 10) of camera mechanism 100, which is very similar to camera mechanism 15 (FIG. 6). When the push button 92 is moved downwardly, end 96b (FIG. 8) of yoke 96 presses spring lever 101 clockwise to push detent 101a into locking engagement with gears 102 and 103 (FIG. 10), the latter being a footage indicator to lock these gears against rotation. The yoke also moves a capping shutter (not shown) similar to shutter 74f (FIG. 6) over the exposure aperture and a cam 96c similar to cam 74d under shuttle 104 (FIG. 9) to disable the shuttle. After these functions are effected, continued downward movement of the yoke 96 turns lever 105 to release the mechanism drive. Then one of the push buttons 106 and 107 (FIG. 8) corresponding to push buttons 53 and 54, respectively, is actuated manually to swing rocker 108 (FIG. 11) from its neutral position to move gear 60 or gear 61 into engagement with gear 24 or gear 25 driven by the camera mechanism to drive zoom lens 109 (FIG. 8) as in the first described embodiment through gear 62 of the gear train. As the rocker 108 is so swung, a spring detent 111 mounted on bracket 99a is moved by pin 112a or pin 112b of fork 112 out of locking engagement with the gear 62, the detent 111 locking the zoom lens against accidental movement thereof when the plate 58 is in its neutral position.

The camera 91 of FIGS. 8 to 11 is of the magazine type and has a hollow shaft 121 (FIG. 10) driven by drive spring 122 of the camera drive to rotate takeup spindle driving gear 123 through spring washer clutch 124, locking gear 102 keyed to shaft 126 which is keyed to gear 123. The gear 103 is freely rotatable on the shaft 126. By the detent 101a engaging gear 102, the washer clutch 124 slips to prevent drive of the film takeup.

Figure 12:
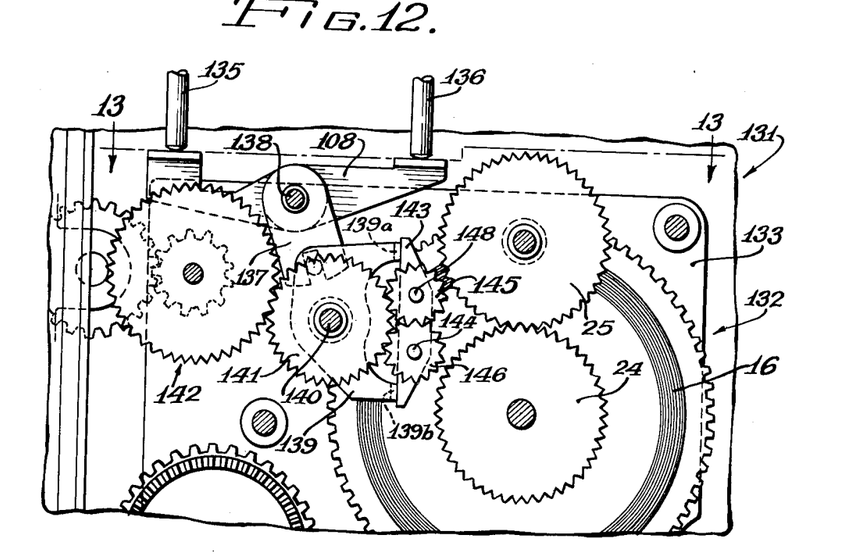
FIG. 12 is an enlarged, fragmentary side elevation view of a camera forming another embodiment of the invention.
Figure 13:
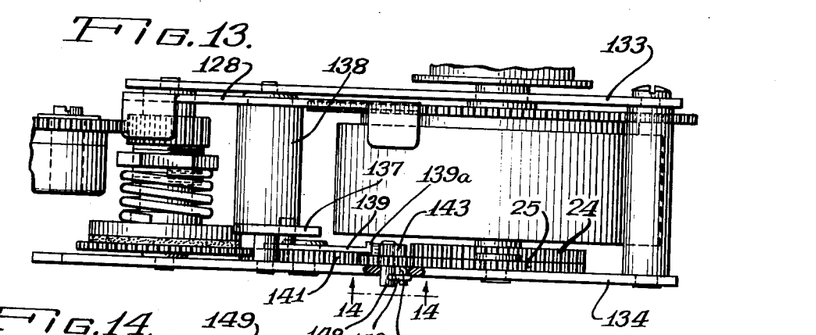
FIG. 13 is a sectional view taken along line 13—13 of FIG. 12.
Figure 14:
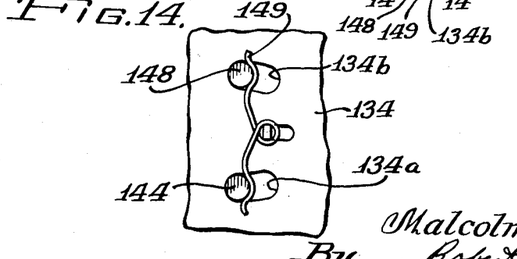
FIG. 14 is a vertical elevation view taken along line 14—14 of FIG. 13.

In FIGS. 12 to 13 there is shown a full time power zoom camera 131 identical with the camera 91 but having a different reversing mechanism for the power takeoff together with a different lock to keep the zoom lens from being accidentally changed in adjustment. The camera 131 has a clockwork type mechanism 132 having plates 133 and 134 together with gears 24 and 25 driven by the spring motor drive 16 whenever the drive is released. Push buttons 135 and 136 may be selectively actuated to turn rocker 108 and fork 137 rigidly connected to the rocker 108 through shaft 138 fixed rigidly to the rocker and fork 137. The fork is coupled to a rocker plate 139 pivotally mounted on shaft 140 mounting gear 141 adapted to drive gear train 142 leading to the zoom lens (not shown), the train 142 and zoom lens being identical with the gear train of the cameras 10 and 91 and the zoom lenses 11 and 109. When the plate 139 is pivoted clockwise, a tab 139a swings plate 143 clockwise about shaft 144 to swing gear 145 out of mesh with the gear 141 and into mesh with the gear 25 to drive the zoom lens from the gear 25 through the gear 145, gear 146 on shaft 144, the gear 141 and the gear train 142. The gear 145 is mounted on plate 143 by shaft 148, and the shafts 144 and 148 project loosely into slots 134a and 134b in mounting plate 134 and both are urged to the left, as viewed in FIG. 14, by torsion spring 149 toward the lefthand ends of the slots 134a and 134b to normally hold both gears 145 and 146 in mesh with the gear 141 to lock the gear 141 against rotation.

When the plate 139 is pivoted counter-clockwise, as viewed in FIG. 12, tab 139b pushes lower end of plate 143 to turn the plate 143 counter-clockwise about shaft 148. This moves gear 146 out of locking engagement with gear 141 and into driving engagement with gear 24 to drive the zoom lens in the opposite direction from that described above when the plate 143 was pivoted clockwise. Thus, whenever the reversible power takeoff is in neutral, the gear train 142 to the zoom lens is locked and is unlocked whenever one of the gears 145 and 146 is moved out of engagement with the gear 141 and into engagement with the respective gear 25 or gear 24.

While the invention is thus described, it is not wished to be limited to the precise details described, as changes may be readily made without departing from the spirit of the invention as defined in the claims.

What is claimed is:

1. In a motion picture camera including an exposure aperture, film feeding means for feeding film past the aperture, an adjustable zoom lens and a motor drive, the combination therewith of manually operable control means for the film feeding means, manually operable zooming means operable to connect the zoom lens and the motor drive, and selectively operable means for disabling the drive of the film feeding means so that the zoom lens may be adjusted without feeding film past the aperture.

2. The improvement of claim 1 wherein said film feeding means includes a pawl for feeding film past the aperture plate, and wherein said driving means includes drivable means for reciprocating the pawl through a cycle including a feed stroke and a return stroke, spring means urging the pawl towards feeding engagement with the film, a drive for driving the drivable means, and wherein said selectively operable disabling means includes means for holding the pawl against the spring means to hold the pawl out of engagement with the film to permit operation of the drive without feeding the film past the aperture plate.

3. The improvement of claim 2 and including shutter means operable to close the aperture when the disabling means is operated.

4. The improvement of claim 2 and including a capping shutter, and means operable by the disabling means for moving the capping shutter from a retracted position to a position covering the exposure aperture.

5. In a motion picture camera including a power drive, first manually operable means for releasing the power drive, an exposure aperture, film feeding means drivable by the power drive for feeding film past the aperture, a zoom lens and second manually operable means for connecting the drive reversibly to the zoom lens, the combination therewith of selectively operable means for actuating the first manually operable means to release the power drive, and means operable by the selectively operable means for disabling the film feeding means to permit drive of the zoom lens without feeding film past the aperture.

6. In a motion picture camera, a housing, a spring motor drive in the housing, control means urged toward a stop position and movable therefrom to an operating position for releasing the drive, manually operable means movable from a stop position to an operating position for moving the control means from the stop position to the operating position, an exposure aperture, film feeding means for engaging film and moving it past the exposure aperture, a zoom lens, second manually operable power takeoff means adapted to selectively connect the drive reversibly to the zoom lens and disconnect the drive from the zoom lens, and auxiliary means operable to simultaneously actuate the control means to its operating position and disable the film feeding means to permit driving of the zoom lens without feeding the film.

7. The motion picture camera of claim 6, wherein the auxiliary means includes a manually slidable member slidably mounted in the housing having an actuating portion for actuating the control means and also being provided with a portion for disabling the film feeding means.

8. The motion picture camera of claim 7 wherein the slidable member also includes a capping shutter movable over the exposure aperture.

9. The motion picture camera of claim 6 and including a mounting plate, a manually operable slide mounted on the plate and having a first portion for actuating the control means and a second portion for disabling the film feeding means.

References Cited by the Examiner

UNITED STATES PATENTS

| | | | |
|---|---|---|---|
| 307,844 | 11/84 | Cottrell | 74—404 |
| 967,384 | 8/10 | Huther | 74—404 |
| 1,067,219 | 7/13 | Hudson | 352—192 |
| 1,271,929 | 7/18 | Nelson | 352—140 |
| 1,892,412 | 12/32 | Steiner | 352—172 |
| 1,950,166 | 3/34 | Durholz | 95—45 |
| 2,186,443 | 1/40 | Becker et al. | 352—80 |
| 2,336,245 | 12/43 | Harmon | 352—173 |
| 2,995,061 | 8/61 | Briskin et al. | 95—45 |
| 3,002,422 | 10/61 | Lohmeyer | 95—45 X |
| 3,106,125 | 10/63 | Martin et al. | 95—45 X |

FOREIGN PATENTS 709,394   8/41   Germany.

NORTON ANSHER, *Primary Examiner.*

WILLIAM MISIEK, *Examiner.*